United States Patent
Sobel et al.

(10) Patent No.: US 8,140,782 B1
(45) Date of Patent: Mar. 20, 2012

(54) VIRTUALIZED APPLICATION COOPERATIVE PREFETCHING

(75) Inventors: William E. Sobel, Jamul, CA (US); Randall Richards Cook, Springville, UT (US)

(73) Assignee: Symantec Corporation, Mountain View, CA (US)

( * ) Notice: Subject to any disclaimer, the term of this patent is extended or adjusted under 35 U.S.C. 154(b) by 1022 days.

(21) Appl. No.: 12/061,043

(22) Filed: Apr. 2, 2008

(51) Int. Cl.
*G06F 13/00* (2006.01)

(52) U.S. Cl. .................. 711/158; 711/E12.071

(58) Field of Classification Search .......... None
See application file for complete search history.

(56) References Cited

U.S. PATENT DOCUMENTS

| | | | |
|---|---|---|---|
| 7,577,722 B1 * | 8/2009 | Khandekar et al. | 709/220 |
| 2008/0127131 A1 * | 5/2008 | Gao et al. | 717/140 |
| 2009/0216828 A1 * | 8/2009 | Gebhart et al. | 709/201 |

OTHER PUBLICATIONS

CC Hadeem, Windows Vista—SuperFetch &amp ReadyBoost, Mar. 29, 2007, http://blogs.technet.com/b/askperf/archive/2007/03/29/windows-vista-superfetch-readyboost.aspx.*

* cited by examiner

*Primary Examiner* — Edward Dudek, Jr.
*Assistant Examiner* — Sean D Rossiter
(74) *Attorney, Agent, or Firm* — McKay and Hodgson, LLP; Philip McKay

(57) ABSTRACT

Embodiments in accordance with the invention permit a virtualization application to interact with a SuperFetch feature of an operating system so that on creation of a virtualization layer the SuperFetch feature is provided the opportunity to act on the newly available file system objects of the virtualization layer. Further, when the virtualization layer is removed, embodiments in accordance with the invention remove the file system objects associated with the virtualization layer from utilization by the SuperFetch feature.

19 Claims, 10 Drawing Sheets

VIRTUALIZED APPLICATION COOPERATIVE PREFETCHING

BACKGROUND OF THE INVENTION

1. Field of the Invention

The present invention relates to computer systems. More particularly, the present invention relates to prefetching of files associated with virtualization applications.

2. Description of Related Art

Microsoft Windows Vista utilizes memory prioritization when managing allocation of system memory, i.e., physical memory. Lower priority system memory is re-used before higher priority system memory when system memory resources are under memory pressure. Additionally Vista includes a memory performance enhancement feature termed SuperFetch. SuperFetch tracks a user's interactions to determine which pages the user uses most frequently. As a user interacts with the computer system, SuperFetch tracks various information, such as foreground applications, time of day, day of week, and if the user is interacting with the computer system e.g., mouse and keyboard, or if the computer system is running maintenance tasks.

When the computer system has free system memory, SuperFetch predictively preloads, e.g., prefetches, the more frequently used pages into low priority system memory so these pages can be moved directly to an application's working set instead of being pulled from physical memory storage, e.g., from disk. This allows the pages to load much faster than they would if the pages had to be pulled from physical memory storage.

Typically files associated with application virtualization technologies, such as device filter drivers which redirect file operations, are not utilized in the SuperFetch scheme. These virtualization technologies typically utilize virtualization layers which can be activated or deactivated, also termed created and removed, respectively. When SuperFetch performs its predictive preloading, the virtualization layers utilized in the virtualization may not be activated, e.g., turned on. Accordingly, SuperFetch cannot find the files associated with the virtualization layer to predictively preload. Consequently, the user does not receive the performance improvement provided by SuperFetch's preloading when launching applications from within the virtualization layer.

SUMMARY OF THE INVENTION

Embodiments in accordance with the invention provide methods to permit a virtualization application to interact with SuperFetch so that on creation of a virtualization layer SuperFetch is provided the opportunity to act on the newly available file system objects of the virtualization layer. Further, when a virtualization layer is removed, embodiments in accordance with the invention provide methods for removing file system objects associated with the virtualization layer.

Embodiments in accordance with the invention are best understood by reference to the following detailed description when read in conjunction with the accompanying drawings.

BRIEF DESCRIPTION OF THE DRAWINGS

Common reference numerals are used throughout the drawings and detailed description to indicate like elements.

DETAILED DESCRIPTION

In the Microsoft® Windows Vista operating system, SuperFetch is implemented in sysmail.dll as a Windows server. SuperFetch relies on support from the memory cache manager, so that SuperFetch can retrieve page usage history as well as direct the memory cache manager to preload pages from files on disk, or from paging/hibernation file, into the system memory.

The memory cache manager then applies a proper memory priority to these pages. There is currently no public application program interface (API) for SuperFetch, however, SuperFetch stores its configuration data as a file in the file system in the directory %systemroot%\Prefetch, herein termed the SuperFetch directory. Herein the particular SuperFetch file in the SuperFetch directory is termed the SuperFetch file. Thus, the page usage data collected by SuperFetch is stored in the SuperFetch file. The various embodiments of the invention further described herein provide virtualized application cooperative prefetching which allows the virtualized application to interact with SuperFetch so that pages associated with the virtualized application can receive the performance enhancements provided by SuperFetch.

Figure 1:
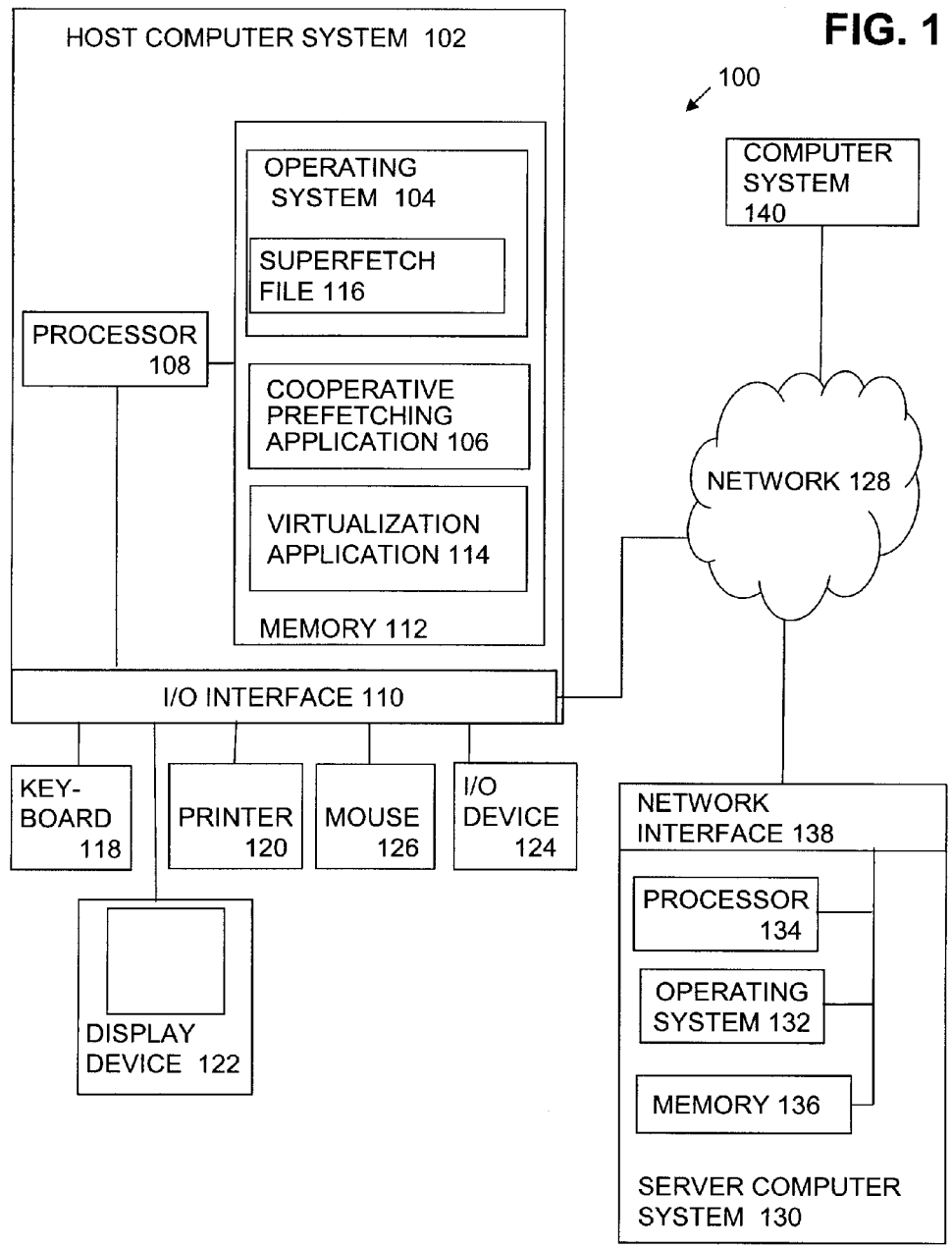
FIG. 1 is a diagram of a computer system including a cooperative prefetching application executing on a host computer system in accordance with one embodiment of the invention.

Referring more particularly now to FIG. 1, FIG. 1 is a diagram of a computer system 100 including a cooperative prefetching application 106 executing on a host computer system 102, e.g., a first computer system, in accordance with one embodiment of the present invention. In the present embodiment, host computer system 102 typically includes a central processing unit (CPU) 108, hereinafter processor 108, an input/output (I/O) interface 110, a memory 112, and an operating system 104. In one embodiment, operating system 102 is an operating system which includes a SuperFetch feature (not shown), such as Microsoft Windows Vista. The SuperFetch feature maintains its usage data used for predictively preloading the system memory in the file system in SuperFetch file 116.

In one embodiment, memory 112 of host computer system 102 further includes cooperative prefetching application 106 and a virtualization application 114, also termed a virtualization engine, which utilizes virtualization layers, herein also simply termed layers. Virtualization layers typically overlay the file system and include the files and registry settings that make up an application. When created, e.g., turned on, the virtualization layer redirects logical file locations to locations in physical memory. When removed, e.g., turned off, the redirection implemented by the virtualization layer is removed, e.g., turned off.

In various embodiments further described herein, cooperative prefetching application 106 permits virtualization application 114 to interact with SuperFetch so that on layer creation SuperFetch is provided the opportunity to act on the newly available file system objects of virtualization layers created by virtualization application 114. Further, when virtualization layers created by virtualization application 114 are removed, in various embodiments further described herein, cooperative prefetching application 106 permits the file system objects associated with the virtualization layers to be removed. In one embodiment cooperative prefetching application 106 is stored in memory 112 of host computer system 102 and executed on host computer system 102.

In one embodiment, operating system 102 utilizes a file system (not shown) for storage and retrieval of data. File systems, such as volume based file systems, e.g., NTFS, are well known to those of skill in the art and are not further described herein to avoid detracting from the description of the invention.

In one embodiment, memory 112 includes system memory. In one embodiment, the system memory is prioritized by operating system 104 into higher priority memory and lower priority memory. In one embodiment, memory 112 includes storage media (not shown) for permanent storage of files, sometimes called physical storage memory, non-volatile memory, non-temporary storage memory, non-temporary storage media, or permanent storage memory. For example, in one embodiment, the storage media is a hard drive, e.g., a magnetic hard drive, a floppy disk, a CD-ROM, and/or a DVD. Generally, files stored in permanent storage memory, e.g., a magnetic hard disk, a floppy disk, a CD-ROM, a DVD, are unaffected and maintained, i.e., are not lost, upon powering down (turning off) of host computer system 102.

In various embodiments, memory 112 further includes volatile memory for non-permanent storage of files, sometimes called temporary storage memory, non-temporary storage media, or non-permanent storage memory. Generally, files stored in non-permanent storage memory, are lost upon powering down (turning off) of host computer system 102. Host computer system 102 may further include standard devices like a keyboard 118, a mouse 126, a printer 120, and a display device 122, as well as, one or more standard input/output (I/O) devices 124, such as a compact disk (CD) or DVD drive, floppy disk drive, or other digital or waveform port for inputting data to and outputting data from host computer system 102. In one embodiment, cooperative prefetching application 106 is loaded onto host computer system 102 via I/O device 124, such as from a CD, DVD or floppy disk containing cooperative prefetching application 106.

In one embodiment, host computer system 102 is coupled to a server computer system 130 of system 100 by a network 128. Server computer system 130 typically includes an operating system 132, a processor 134, a memory 136, and a network interface 138. Server computer system 130 may further include standard devices such as a keyboard, a mouse, a printer, a display device and an I/O device(s). The various hardware components of server computer system 130 are not illustrated to avoid detracting from the description of the invention.

Host computer system 102 can also be coupled to other computer systems of system 100, such as one or more additional computer system 140, by network 128. In one embodiment, computer system 140 is similar to server computer system 130 and, for example, includes a central processing unit, an operating system, an input output (I/O) interface, and a memory. Computer system 140 may further include standard devices such as a keyboard, a mouse, a printer, a display device and an I/O device(s). The various hardware components of computer system 140 are not illustrated to avoid detracting from the description of the invention.

Network 128 can be any network or network system that is of interest to a user. In various embodiments, network interface 138 and I/O interface 110 include analog modems, digital modems, or a network interface card. The particular type, and configuration, of host computer system 102, computer system 140, and server computer system 130 are not essential to the present invention.

The following embodiments of the invention describe methods which permit a virtualization application to interact with SuperFetch. FIGS. 2-6 describe various embodiments of methods which permit a virtualization application to interact with SuperFetch so that on creation of a virtualization layer SuperFetch is provided the opportunity to act on the newly available file system objects of the layer. FIGS. 7-10 describe various embodiments of methods which permit a virtualization application to interact with SuperFetch so that on removal of the virtualization layer file system objects associated with the layer are removed.

Figure 2:
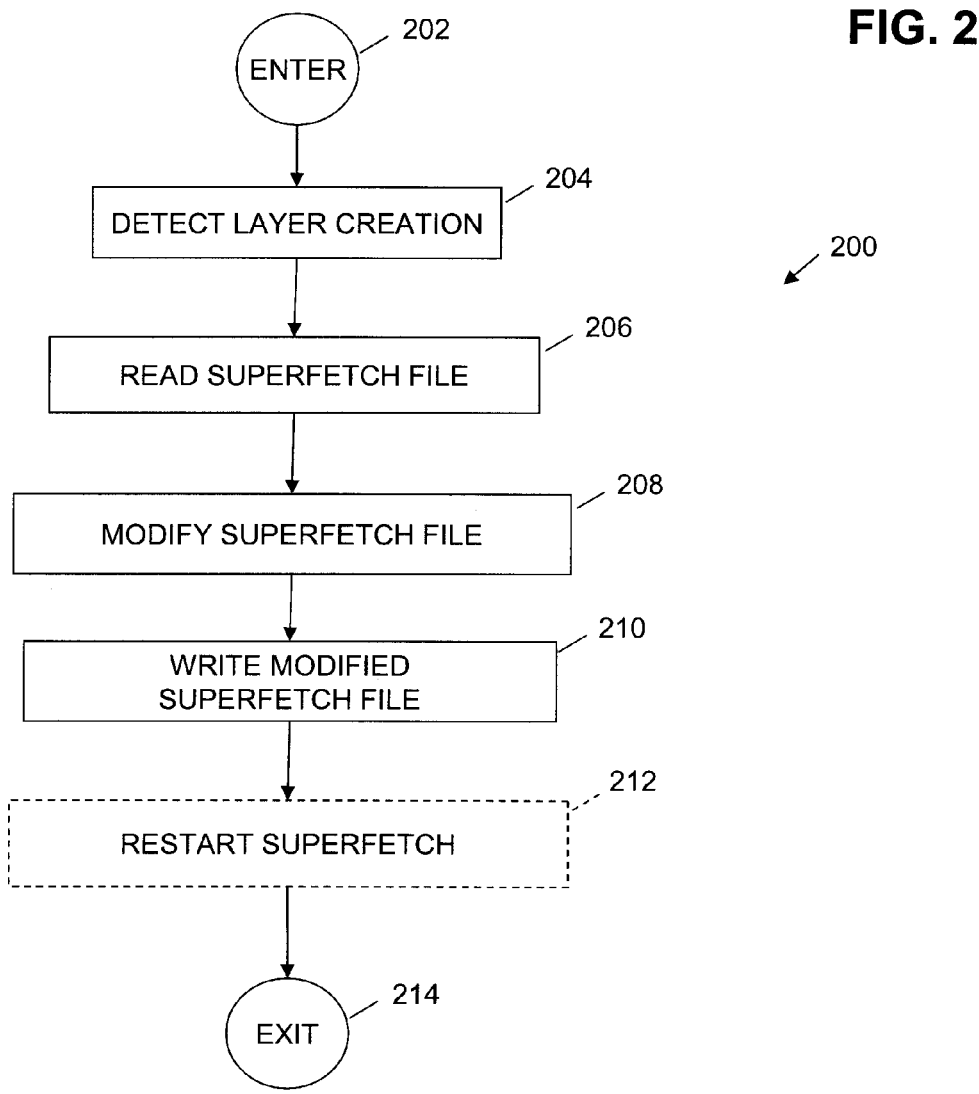
FIG. 2 illustrates a process flow diagram of a method for cooperative prefetching on layer creation in accordance with one embodiment of the invention.

FIG. 2 illustrates a process flow diagram of a method 200 for cooperative prefetching on layer creation in accordance with one embodiment of the invention. Referring now to FIGS. 1 and 2 together, in one embodiment, execution of cooperative prefetching application 106 by processor 108 results in the operations of method 200 as described below. In one embodiment, method 200 is entered at an ENTER operation 202 and processing transitions to a DETECT LAYER CREATION operation 204.

In DETECT LAYER CREATION operation 204, the creation of a virtualization layer, such as by virtualization application 114, is detected by cooperative prefetching application 106. Herein when a virtualization layer, herein also simply termed a layer, is turned on, it is assumed the memory cache manager, e.g., the memory cache manager of operating system 104, can "see" the layer is turned on. From DETECT LAYER CREATION operation 204, processing transitions to a READ SUPERFETCH FILE operation 206.

In READ SUPERFETCH FILE operation 206, cooperative prefetching application 106 reads the current SuperFetch file from the SuperFetch file. As earlier described the SuperFetch file includes various usage information SuperFetch maintains for use in predictively reading files to the prefetch cache. From READ SUPERFETCH FILE operation 206, processing transitions to a MODIFY SUPERFETCH FILE operation 208.

In MODIFY SUPERFETCH FILE operation 208, cooperative prefetching application 106 modifies the SuperFetch file to include information associated with the virtualization layer created in operation 204, thereby generating a modified SuperFetch file. In particular, in one embodiment cooperative prefetching application 106 modifies the SuperFetch file to include the files in the virtualization layer created in operation

204. From MODIFY SUPERFETCH FILE operation 208, processing transitions to a WRITE MODIFIED SUPERFETCH FILE operation 210.

In WRITE MODIFIED SUPERFETCH FILE operation 210, cooperative prefetching application 106 writes the modified SuperFetch file back out to the SuperFetch file. For example, in one embodiment, cooperative prefetching application 106 overwrites the current version of the SuperFetch file with the modified SuperFetch file created in operation 208. From WRITE MODIFIED SUPERFETCH FILE operation 210, processing transitions to an optional RESTART SUPERFETCH operation 212 or transitions directly to an EXIT operation 214 with processing exiting method 200. Optionally, processing transitions and returns to operation 204 on detection of a next layer creation.

In optional RESTART SUPERFETCH operation 212 cooperative prefetching application 106 restarts the SuperFetch feature. Restart of the SuperFetch feature is well documented and known those of skill in the art and is not further described herein to avoid detracting from the description of the invention. From optional RESTART SUPERFETCH operation 212, processing transitions to EXIT operation 214 with processing exiting method 200 or optionally returning to operation 204 on detection of a next layer creation.

In an alternate embodiment, rather than writing back the modified SuperFetch file to the SuperFetch directory, the modified SuperFetch file is written to an alternate location and SuperFetch is redirected to the alternate location.

Figure 3:
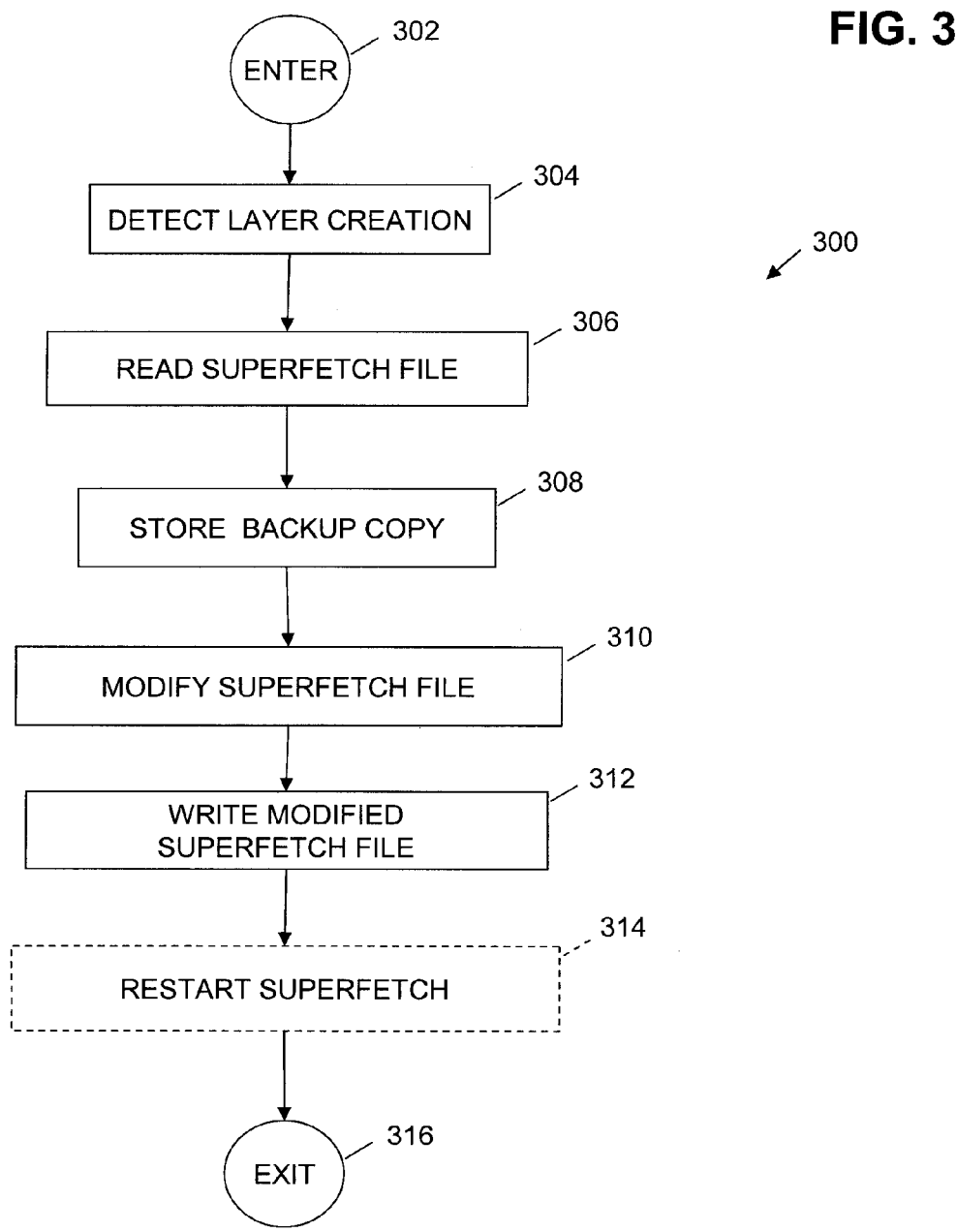
FIG. 3 illustrates a process flow diagram of a method for cooperative prefetching on layer creation in accordance with another embodiment of the invention.

FIG. 3 illustrates a process flow diagram of a method 300 for cooperative prefetching on layer creation in accordance with one embodiment of the invention. Referring now to FIGS. 1 and 3 together, in one embodiment, execution of cooperative prefetching application 106 by processor 108 results in the operations of method 300 as described below. In one embodiment, method 300 is entered at an ENTER operation 302 and processing transitions to a DETECT LAYER CREATION operation 304.

In DETECT LAYER CREATION operation 304, the creation of a virtualization layer, such as by virtualization application 114, is detected by cooperative prefetching application 106. Herein when a virtualization layer, herein also simply termed a layer, is turned on, it is assumed the memory cache manager, e.g., the memory cache manager of operating system 104, can "see" the layer is turned on. From DETECT LAYER CREATION operation 304, processing transitions to a READ SUPERFETCH FILE operation 306.

In READ SUPERFETCH FILE operation 306, cooperative prefetching application 106 reads the current SuperFetch file from the SuperFetch directory. As earlier described the SuperFetch file includes various usage information SuperFetch maintains for use in predictively reading files to the prefetch cache. From READ SUPERFETCH FILE operation 306, processing transitions to a CREATE BACKUP COPY operation 308.

In CREATE BACKUP COPY operation 308, cooperative prefetching application 106 creates a backup copy, i.e., a copy of the current SuperFetch file, and stores the backup copy to a memory structure, such as a temporary memory location on host computer system 102. From CREATE BACKUP COPY operation 308, processing transitions to MODIFY SUPERFETCH FILE operation 310.

In MODIFY SUPERFETCH FILE operation 310, cooperative prefetching application 106 modifies the SuperFetch file to include information associated with the virtualization layer created in operation 304, thereby generating a modified SuperFetch file. In particular, in one embodiment cooperative prefetching application 106 modifies the SuperFetch file to include the files in the virtualization layer created in operation 304. From MODIFY SUPERFETCH FILE operation 310, processing transitions to a WRITE MODIFIED SUPERFETCH FILE operation 312.

In WRITE MODIFIED SUPERFETCH FILE operation 312, cooperative prefetching application 106 writes the modified SuperFetch file back out to the SuperFetch file. For example, in one embodiment, cooperative prefetching application 106 overwrites the current version of the SuperFetch file with the modified SuperFetch file created in operation 310. From WRITE MODIFIED SUPERFETCH FILE operation 312, processing transitions to an optional RESTART SUPERFETCH operation 314 or transitions directly to an EXIT operation 316 with processing exiting method 300. Optionally, processing transitions and returns to operation 304 on detection of a next layer creation.

In optional RESTART SUPERFETCH operation 314 cooperative prefetching application 106 restarts the SuperFetch feature. Restart of the SuperFetch feature is well documented and known those of skill in the art and is not further described herein to avoid detracting from the description of the invention. From optional RESTART SUPERFETCH operation 314, processing transitions to EXIT operation 316 with processing exiting method 300 or optionally returning to operation 304 on detection of a next layer creation.

Figure 4:
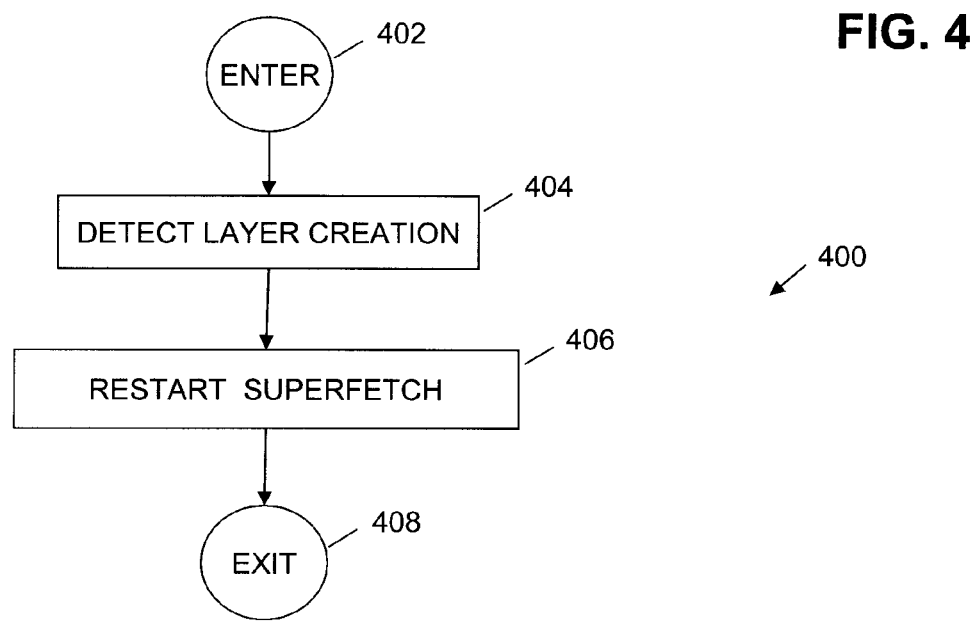
FIG. 4 illustrates a process flow diagram of a method for cooperative prefetching on layer creation in accordance with another embodiment of the invention.

FIG. 4 illustrates a process flow diagram of a method 400 for cooperative prefetching on layer creation in accordance with one embodiment of the invention. Referring now to FIGS. 1 and 4 together, in one embodiment, execution of cooperative prefetching application 106 by processor 108 results in the operations of method 400 as described below. In one embodiment, method 400 is entered at an ENTER operation 402 and processing transitions to a DETECT LAYER CREATION operation 404.

In DETECT LAYER CREATION operation 404, the creation of a virtualization layer, such as by virtualization application 114, is detected by cooperative prefetching application 106. Herein when a virtualization layer, herein also simply termed a layer, is turned on, it is assumed the memory cache manager, e.g., the memory cache manager of operating system 104, can "see" the layer is turned on. From DETECT LAYER CREATION operation 404, processing transitions to a RESTART SUPERFETCH operation 406.

In RESTART SUPERFETCH operation 406, cooperative prefetching application 106 restarts the SuperFetch feature. Restart of the SuperFetch feature is well documented and known those of skill in the art and is not further described herein to avoid detracting from the description of the invention.

By restarting the SuperFetch system, SuperFetch will now begin to record user interactions that include the virtualization layer is in existence when SuperFetch is restarted. This permits SuperFetch to include the files and data associated with use of the virtualization layer to be included in the memory caching operations. From RESTART SUPERFETCH operation 406 transitions to an EXIT operation 408 with processing exiting method 400 or optionally returning to operation 404 on detection of a next layer creation.

Figure 5:
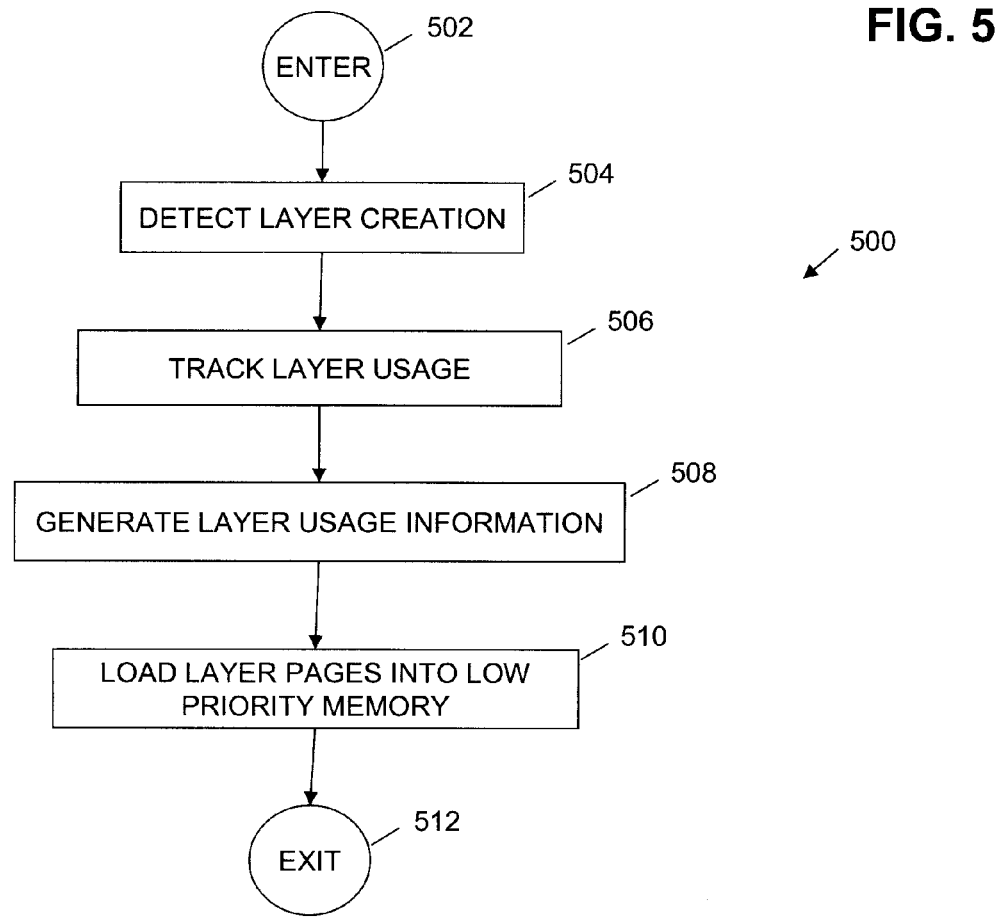
FIG. 5 illustrates a process flow diagram of a method for cooperative prefetching on layer creation in accordance with another embodiment of the invention.

FIG. 5 illustrates a process flow diagram of a method 500 for cooperative prefetching on layer creation in accordance with one embodiment of the invention. Referring now to FIGS. 1 and 5 together, in one embodiment, execution of cooperative prefetching application 106 by processor 108 results in the operations of method 500 as described below. In one embodiment, method 500 is entered at an ENTER operation 502 and processing transitions to a DETECT LAYER CREATION operation 504.

In DETECT LAYER CREATION operation 504, the creation of a virtualization layer, such as by virtualization application 114, is detected by cooperative prefetching application 106. Herein when a virtualization layer, herein also simply termed a layer, is turned on, it is assumed the memory cache manager, e.g., the memory cache manager of operating system 104, can "see" the layer is turned on. From DETECT LAYER CREATION operation 504, processing transitions to a TRACK LAYER USAGE operation 506.

In TRACK LAYER USAGE operation 506, cooperative prefetching application 106 records user interactions with the virtualization layer. In one embodiment, cooperative prefetching application 106 records user interactions with the virtualization layer. In one embodiment, the user interactions that are recorded are similar to those user interactions that would be recorded by SuperFetch. In one embodiment, the user interactions that are recorded are different from those user interactions that would be recorded by SuperFetch. From TRACK LAYER USAGE operation 506, processing transitions to a GENERATE LAYER USAGE INFORMATION operation 508.

In GENERATE LAYER USAGE INFORMATION operation 508, cooperative prefetching application 106 generates layer usage information associated with the user interactions with the virtualization layer created in operation 504. In one embodiment, the layer usage information is similar to usage information that would be generated by SuperFetch. In one embodiment the layer usage information is different from usage information that would be generated by SuperFetch. In one embodiment the layer usage information includes a prioritization of pages to allow cooperative prefetching application 106 to predictively load pages associated with the layer into low priority system memory based on the prioritization. From GENERATE LAYER USAGE INFORMATION operation 508, processing transitions to a LOAD LAYER PAGES INTO LOW PRIORITY MEMORY operation 510.

In LOAD LAYER PAGES INTO LOW PRIORITY MEMORY operation 510, cooperative prefetching application 106 loads the pages associated with the virtualization layer into low priority system memory based on the recorded layer usage information. In one embodiment, cooperative prefetching application 106 loads the pages associated with the virtualization layer based on the prioritization. In one embodiment, the pages are loaded into low priority system memory via a low priority I/O procedure. Thus, in this embodiment, cooperative prefetching application 106 acts as a companion SuperFetch, and independently from SuperFetch loads pages associated with the virtualization layer into low priority system memory based on the layer usage information generated in operation 508.

In one embodiment cooperative prefetching application 106 includes a layer service that "walks", e.g., iterates, the layer and loads pages from the layer to lower priority memory. From LOAD LAYER PAGES INTO LOW PRIORITY MEMORY operation 510, processing transitions to an EXIT operation 512 with processing exiting method 500 or optionally returning to operation 504 on detection of a next layer creation.

Figure 6:
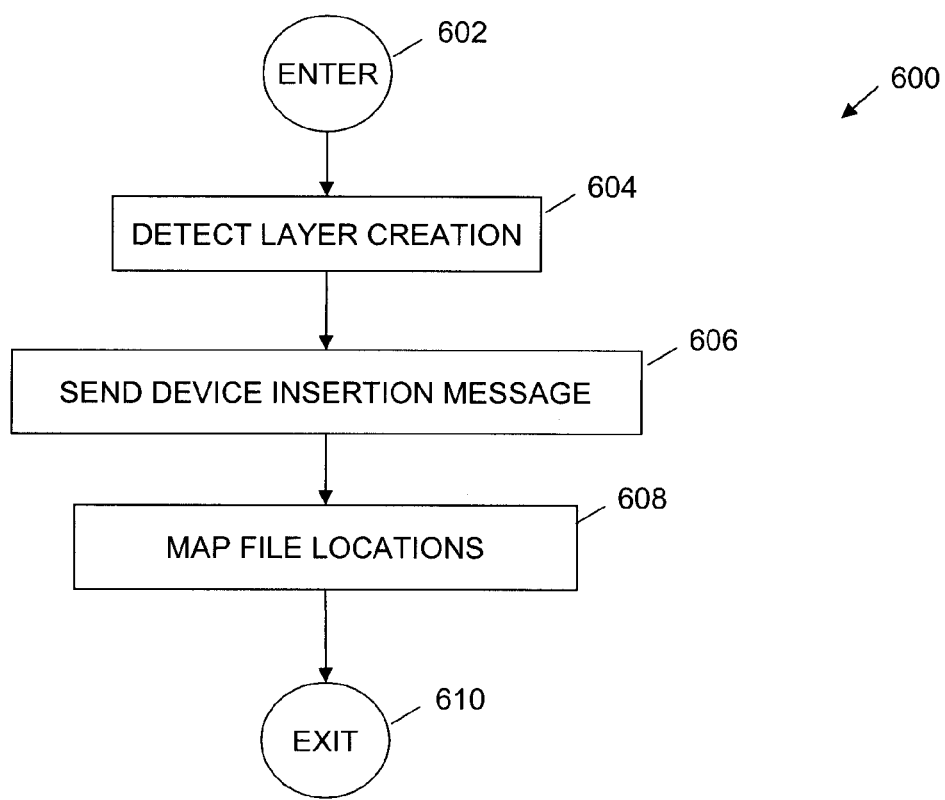
FIG. 6 illustrates a process flow diagram of a method for cooperative prefetching on layer creation in accordance with another embodiment of the invention.

FIG. 6 illustrates a process flow diagram of a method 600 for cooperative prefetching on layer creation in accordance with one embodiment of the invention. Referring now to FIGS. 1 and 6 together, in one embodiment, execution of cooperative prefetching application 106 by processor 108 results in the operations of method 600 as described below. In one embodiment, method 600 is entered at an ENTER operation 602 and processing transitions to a DETECT LAYER CREATION operation 604.

In DETECT LAYER CREATION operation 604, the creation of a virtualization layer, such as by virtualization application 114, is detected by cooperative prefetching application 106. In this embodiment, the contents of the virtualization layer are placed into a mountable volume. Mountable volumes are well known to those of skill in the art and are not further described herein to avoid detracting from the description of the invention. From DETECT LAYER CREATION operation 604, processing transitions to a SEND DEVICE INSERTION MESSAGE operation 606.

In SEND DEVICE INSERTION MESSAGE operation 606, cooperative prefetching application 106 generates and sends a device insertion message to operating system 104. In one embodiment, the device insertion message identifies the volume including the files associated with the virtualization layer. When mounted as a volume, the file system treats the files of the virtualization layer as a new drive, and SuperFetch will transparently begin providing services to that drive and the SuperFetch feature will extend to the virtualization layer files. From SEND DEVICE INSERTION MESSAGE operation 606, processing transitions to a MAP FILE LOCATIONS operation 608.

In MAP FILE LOCATIONS operation 608, cooperative prefetching application 106 maps the logical file locations of the virtualization layer files to actual physical locations on the mounted volume in the file system. From MAP FILE LOCATIONS operation 608, processing transitions to an EXIT operation 610 with processing exiting method 600, or optionally returning to operation 604 on detection of a next layer creation.

Methods 200-600 described various embodiments of methods which permit a virtualization application to interact with SuperFetch so that on creation of a virtualization layer SuperFetch is provided the opportunity to act on the newly available file system objects of the layer. Consequently, virtualization applications are able to realize at least some of the preloading enhancements of the SuperFetch feature.

Methods 700-1000 now describe various embodiments of methods which permit a virtualization application to interact with SuperFetch so that on removal of the virtualization layer, file system objects associated with the layer are removed. Thus, broadly viewed, methods 700-1000 together with FIGS. 7-10 describe various embodiments of methods to undo the modifications implemented by methods 200-600.

Figure 7:
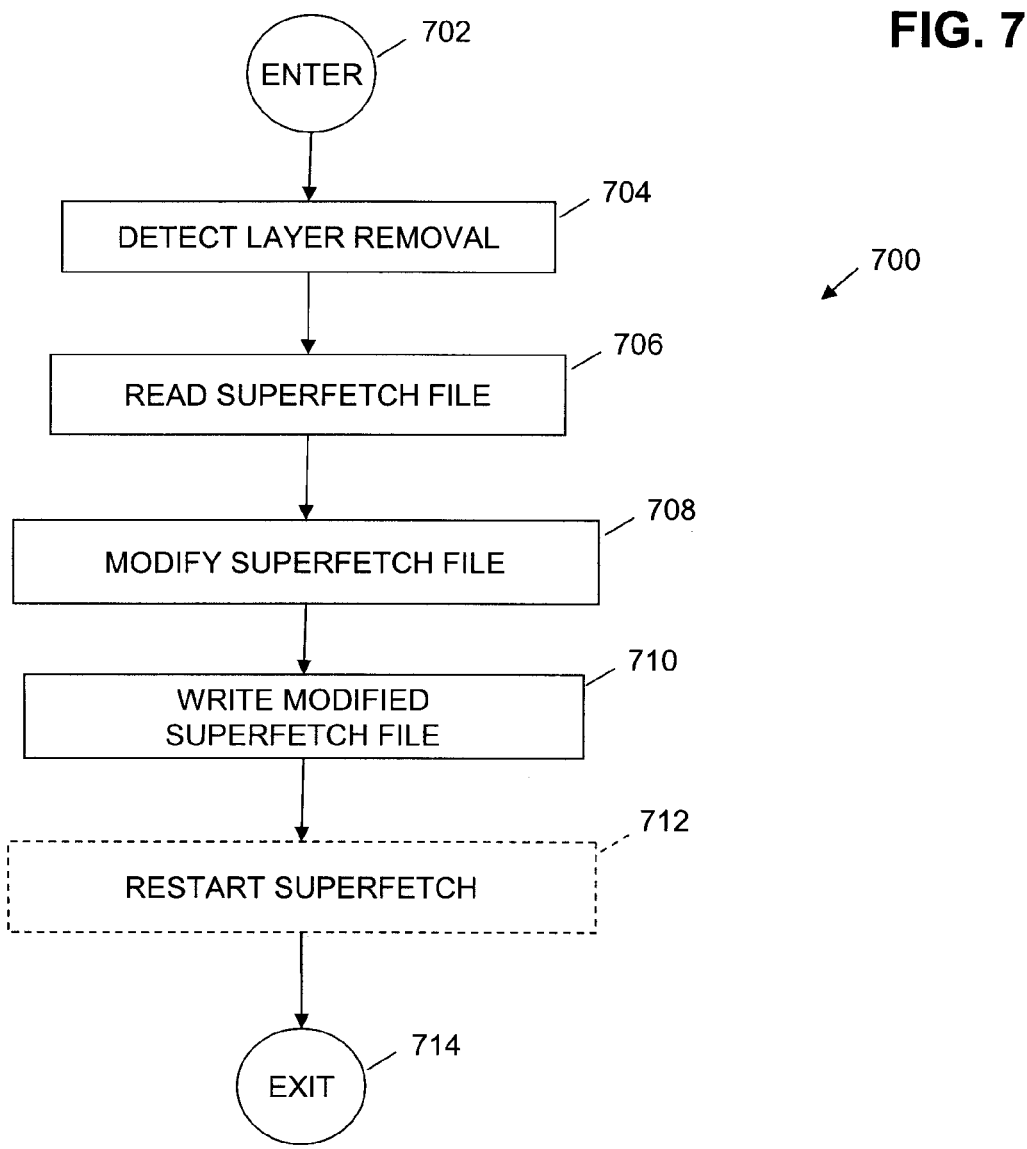
FIG. 7 illustrates a process flow diagram of a method for cooperative prefetching on layer removal in accordance with one embodiment of the invention.

FIG. 7 illustrates a process flow diagram of a method 700 for cooperative prefetching on layer removal in accordance with one embodiment of the invention. In one embodiment, method 700 follows method 200 on removal of the virtualization layer detected in operation 204 (FIG. 2).

Referring now to FIGS. 1, 2, and 7 together, in one embodiment, execution of cooperative prefetching application 106 by processor 108 results in the operations of method 700 as described below. In one embodiment, method 700 is entered at an ENTER operation 702 and processing transitions to a DETECT LAYER REMOVAL operation 704.

In DETECT LAYER REMOVAL operation 704, the removal of a virtualization layer, such as by virtualization application 114, is detected by cooperative prefetching application 106. In one embodiment the virtualization layer is the layer detected in operation 204 (FIG. 2). From DETECT LAYER REMOVAL operation 704, processing transitions to a READ SUPERFETCH FILE operation 706.

In READ SUPERFETCH FILE operation 706, cooperative prefetching application 106 reads the current SuperFetch file from the SuperFetch directory. In one embodiment, it is assumed the SuperFetch file has been modified to include information about the virtualization layer, for example, as described in operation 208 (FIG. 2). From READ SUPERFETCH FILE operation 706, processing transitions to a MODIFY SUPERFETCH FILE operation 708.

In MODIFY SUPERFETCH FILE operation 708, cooperative prefetching application 106 modifies the SuperFetch file to remove information associated with the virtualization layer that was added, such as in operation 208 (FIG. 2). From MODIFY SUPERFETCH FILE operation 708, processing transitions to a WRITE MODIFIED SUPERFETCH FILE operation 710.

In WRITE MODIFIED SUPERFETCH FILE operation 710, operation 210, cooperative prefetching application 106 writes the modified SuperFetch file back out to the SuperFetch directory. For example, in one embodiment, cooperative prefetching application 106 overwrites the current version of the SuperFetch file with the modified SuperFetch file created in operation 708. In this way information associated with the virtualization layer is now removed from the SuperFetch file. From WRITE MODIFIED SUPERFETCH FILE operation 710, processing transitions to an optional RESTART SUPERFETCH operation 712 or transitions directly to an EXIT operation 714 with processing exiting method 700. Optionally, processing transitions and returns to operation 704 on detection of a next layer removal.

In optional RESTART SUPERFETCH operation 712 cooperative prefetching application 106 restarts the SuperFetch feature. Restart of the SuperFetch feature is well documented and known those of skill in the art and is not further described herein to avoid detracting from the description of the invention. From optional RESTART SUPERFETCH operation 712, processing transitions to EXIT operation 714 with processing exiting method 700 or optionally returning to operation 704 on detection of a next layer removal.

Figure 8:
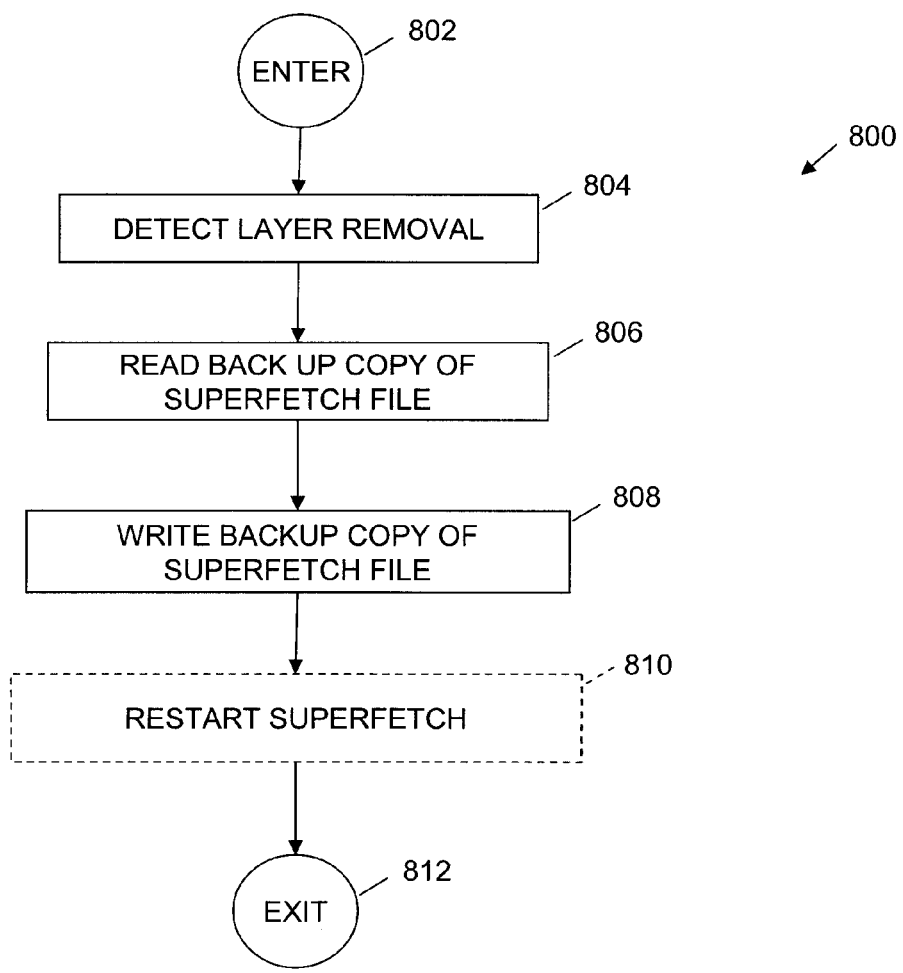
FIG. 8 illustrates a process flow diagram of a method for cooperative prefetching on layer removal in accordance with another embodiment of the invention.

FIG. 8 illustrates a process flow diagram of a method 800 for cooperative prefetching on layer removal in accordance with one embodiment of the invention. In one embodiment, method 800 follows method 300 on removal of the virtualization layer detected in operation 304 (FIG. 3).

Referring now to FIGS. 1, 3, and 8 together, in one embodiment, execution of cooperative prefetching application 106 by processor 108 results in the operations of method 800 as described below. In one embodiment, method 800 is entered at an ENTER operation 802 and processing transitions to a DETECT LAYER REMOVAL operation 804.

In DETECT LAYER REMOVAL operation 804, the removal of a virtualization layer, such as by virtualization application 114, is detected by cooperative prefetching application 106. In one embodiment the virtualization layer is the layer detected in operation 304 (FIG. 3). From DETECT LAYER REMOVAL operation 804, processing transitions to a READ BACKUP COPY OF SUPERFETCH FILE operation 806.

In READ BACKUP COPY OF SUPERFETCH FILE operation 806, cooperative prefetching application 106 reads the backup copy of the SuperFetch file. For example in one embodiment cooperative prefetching application 106 reads the backup copy of the SuperFetch file earlier stored in operation 308 (FIG. 3). From READ BACKUP COPY OF SUPERFETCH FILE operation 806 processing transitions to a WRITE BACKUP COPY OF SUPERFETCH FILE operation 808.

In WRITE BACKUP COPY OF SUPERFETCH FILE operation 808, cooperative prefetching application 106 writes the backup copy of SuperFetch file back out to the SuperFetch directory. For example, in one embodiment, cooperative prefetching application 106 overwrites the current version of the SuperFetch file with the backup copy of SuperFetch file read in operation 806. In this way information associated with the virtualization layer is now removed from the SuperFetch file. From WRITE BACKUP COPY OF SUPERFETCH FILE operation 808, processing transitions to an optional RESTART SUPERFETCH operation 810 or transitions directly to an EXIT operation 812 with processing exiting method 800. Optionally, processing transitions and returns to operation 804 on detection of a next layer removal.

In optional RESTART SUPERFETCH operation 810 cooperative prefetching application 106 restarts the SuperFetch feature. Restart of the SuperFetch feature is well documented and known those of skill in the art and is not further described herein to avoid detracting from the description of the invention. From optional RESTART SUPERFETCH operation 810, processing transitions to EXIT operation 812 with processing exiting method 800 or optionally returning to operation 804 on detection of a next layer removal.

Figure 9:
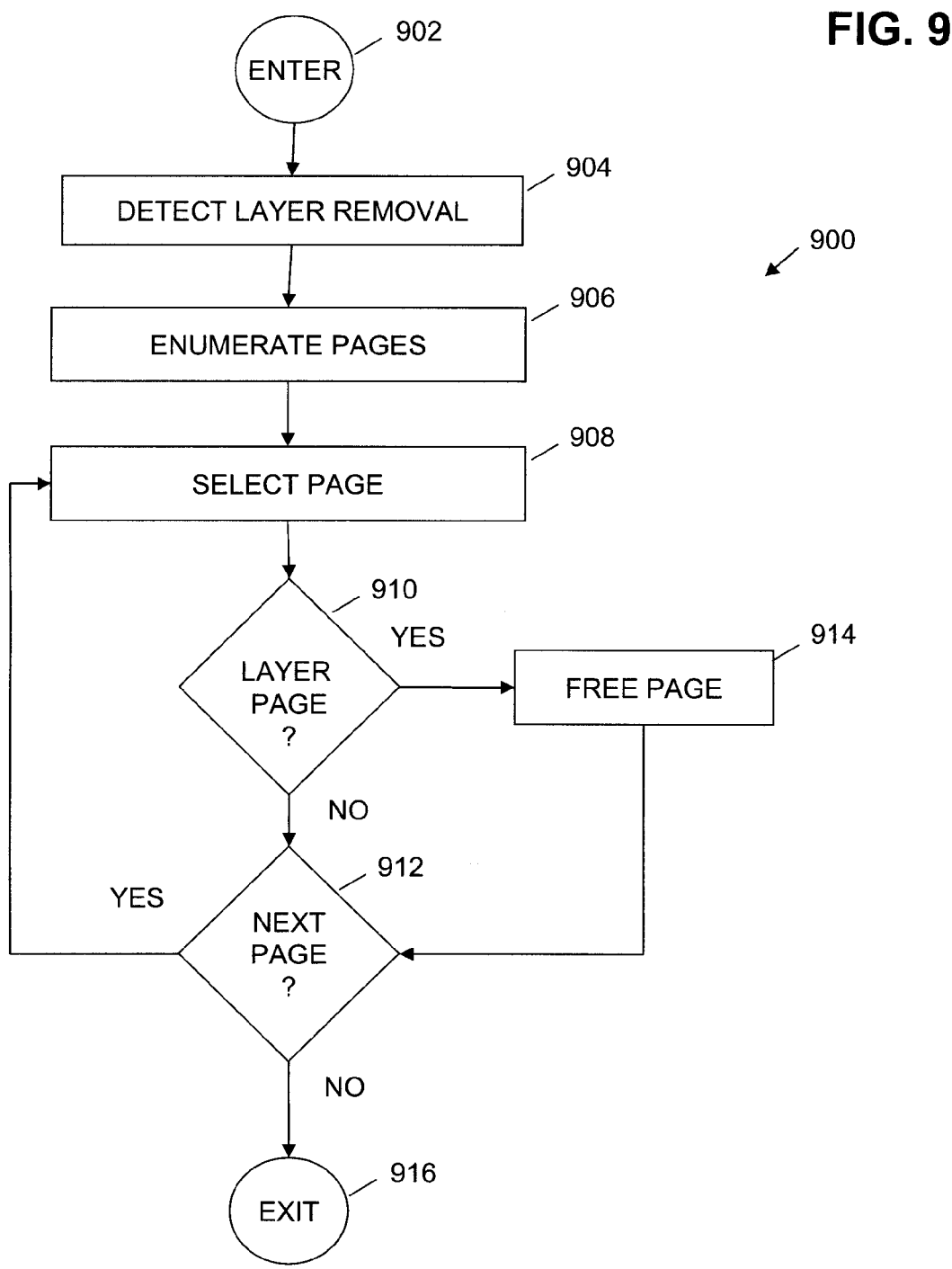
FIG. 9 illustrates a process flow diagram of a method for cooperative prefetching on layer removal in accordance with another embodiment of the invention.

FIG. 9 illustrates a process flow diagram of a method 900 for cooperative prefetching on layer removal in accordance with one embodiment of the invention. In one embodiment, method 900 follows method 400 on removal of the virtualization layer detected in operation 404 (FIG. 4).

Referring now to FIGS. 1, 4 and 9 together, in one embodiment, execution of cooperative prefetching application 106 by processor 108 results in the operations of method 900 as described below. In one embodiment, method 900 is entered at an ENTER operation 902 and processing transitions to a DETECT LAYER REMOVAL operation 904.

In DETECT LAYER REMOVAL operation 904, the removal of a virtualization layer, such as by virtualization application 114, is detected by cooperative prefetching application 106. In one embodiment the virtualization layer is the layer detected in operation 404 (FIG. 4). From DETECT LAYER REMOVAL operation 904, processing transitions to an ENUMERATE PAGES operation 906.

In ENUMERATE PAGES operation 906, cooperative prefetching application 106 enumerates the cached pages in the system memory. In one embodiment of the invention, enumeration of the cached pages creates an enumerated page listing. Enumeration of cached pages in system memory is well known to those of skill in the art and not further detailed herein to avoid detracting from the description of the invention. From ENUMERATE CACHED PAGES operation 906, processing transitions to a SELECT PAGE operation 908.

In SELECT PAGE operation 908, cooperative prefetching application 106 selects an initial page in enumerated page listing to process. From SELECT PAGE operation 908, processing transitions to a LAYER PAGE check operation 910.

In LAYER PAGE check operation 910, cooperative prefetching application 106 determines whether the page selected in operation 908 is associated with the removed virtualization layer detected in operation 904. For example, cooperative prefetching application 106 compares the file path or portion of the file path of the enumerated page with the file path or a portion of the file path of the removed virtualization layer. If the file path or a portion of the file path matches, the selected page is determined to be associated with the removed virtualization layer, otherwise it is not determined to be associated with the removed file layer.

In one embodiment, if the selected page is not associated with the removed virtualization layer ("NO"), from LAYER PAGE check operation 910, processing transitions to a NEXT PAGE check operation 912, further described later herein. Alternatively, if the selected page is associated with the removed virtualization layer ("YES"), processing transitions from LAYER PAGE check operation 910 to a FREE PAGE operation 914.

In FREE PAGE operation 914, cooperative prefetching application 106 generates and sends an instruction to the memory cache manager to free the selected page from system memory. Generation of an instruction to a memory cache manager to free a page from system memory is well known to those of skill in the art and not further described herein to avoid detracting from the description of the invention. From FREE PAGE operation 914, processing transitions to NEXT PAGE check operation 912.

In NEXT PAGE check operation 912, cooperative prefetching application 106 determines whether there is another page in the enumerated page listing to process, i.e., a next page. In one embodiment, if there is a next page to process ("YES"), from NEXT PAGE check operation 912, processing transitions and returns to SELECT PAGE operation 908 with a next page in the enumerated page listing being selected for processing and operation 908-914 being repeated as appropriate. Alternatively, if there is not a next page to process ("NO"), from NEXT PAGE check operation 912, processing transitions to an EXIT operation 916, with processing exiting method 900 or optionally returning to operation 904 on detection of a next layer removal.

Figure 10:
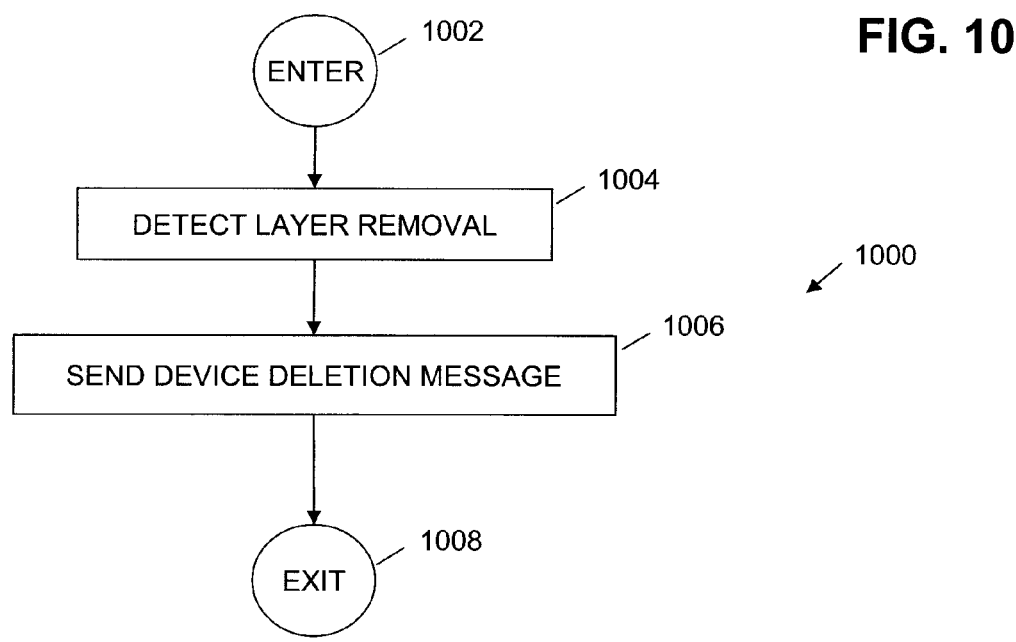
FIG. 10 illustrates a process flow diagram of a method for cooperative prefetching on layer removal in accordance with another embodiment of the invention.

FIG. 10 illustrates a process flow diagram of a method 1000 for cooperative prefetching on layer removal in accordance with one embodiment of the invention. In one embodiment, method 1000 follows method 600 on removal, e.g., unmounting, of the virtualization layer detected in operation 604 (FIG. 6).

Referring now to FIGS. 1, 6, and 10 together, in one embodiment, execution of cooperative prefetching application 106 by processor 108 results in the operations of method 1000 as described below. In one embodiment, method 1000 is entered at an ENTER operation 1002 and processing transitions to a DETECT LAYER REMOVAL operation 1004.

In DETECT LAYER REMOVAL operation 1004, the removal of a virtualization layer, such as by virtualization application 114, is detected by cooperative prefetching application 106. From DETECT LAYER REMOVAL operation 1004, processing transitions to a SEND DEVICE DELETION MESSAGE operation 1006.

In SEND DEVICE DELETION MESSAGE operation 1006, cooperative prefetching application 106 generates and sends a device deletion message to operating system 104. In one embodiment, the device deletion message identifies the volume including the virtualized application files mounted in operation 606. The SuperFetch feature will now cease to extend to the virtualization layer files of the volume. From SEND DEVICE DELETION MESSAGE operation 1006, processing transitions to an EXIT operation 1008 with processing exiting method 1000 or optionally returning to operation 1004 on detection of a next layer removal.

Although methods 700-1000 were described with reference to selected methods 200-600, it can be understood by those of skill in the art that methods 700-1000 are not limited to those exemplar methods. Thus, for example the method 700 can be used to remove virtualization layer file objects arising from use of methods 200 or method 300, or method 400. Further, method 900 can be used to remove virtualization layer file objects arising from use of method 200, method 300, or method 500.

Additionally, a method from methods 200-600 and a method from methods 700-1000 can be individually combined as a single method to provide cooperative prefetching of virtualization layer file system objects on layer creation and then provide removal of those file system objects on layer removal. Thus for example, method 600 and method 1000 can be combined into a single method.

In one embodiment of the invention, cooperative prefetching application 106 is in memory 112. As used herein, a computer memory refers to a volatile memory, a non-volatile memory, or a combination of the two. Although cooperative prefetching application 106 is referred to as an application, this is illustrative only. Cooperative prefetching application 106 should be capable of being called from an application or the operating system. In one embodiment, an application is generally defined to be any executable code. Moreover, those of skill in the art will understand that when it is said that an application or an operation takes some action, the action is the result of executing one or more instructions by a processor.

Embodiments in accordance with the present invention may be carried out using any suitable hardware configuration or means involving a personal computer, a workstation, a portable device, or a network of computer devices. Other network configurations other than client-server configurations, e.g., peer-to-peer, web-based, intranet, internet network configurations, are used in other embodiments.

Herein, a computer program product comprises a medium configured to store or transport computer readable code in accordance with an embodiment of the present invention. Some examples of computer program products are CD-ROM disks, DVDs, ROM cards, floppy disks, magnetic tapes, computer hard drives, and servers on a network. In another embodiment, a computer program product comprises a tangible storage medium configured to store computer readable code including CD-ROM disks, DVDs, ROM cards, floppy disks, magnetic tapes, computer hard drives, and servers on a network.

As illustrated in FIG. 1, this medium may belong to the computer system itself. However, the medium also may be removed from the computer system. For example, cooperative prefetching application 106 may be stored in memory (not shown) that is physically located in a location different from processor 108. Processor 108 should be coupled to the memory. This could be accomplished in a client-server system, or alternatively via a connection to another computer via modems and analog lines, or digital interfaces and a digital carrier line.

More specifically, in one embodiment, host computer system 102 and/or server computer system 130 is a portable computer, a workstation, a two-way pager, a cellular telephone, a digital wireless telephone, a personal digital assistant, a server computer, an Internet appliance, or any other device that includes components that can execute the functionality of cooperative prefetching application 106 in accordance with at least one of the embodiments as described herein. Similarly, in another embodiment, host computer system 102 and/or server computer system 130 is comprised of multiple different computers, wireless devices, cellular telephones, digital telephones, two-way pagers, or personal digital assistants, server computers, or any desired combination of these devices that are interconnected to perform, the methods as described herein.

In view of this disclosure, the functionality of cooperative prefetching application 106 in accordance with one embodiment of present invention can be implemented in a wide variety of computer system configurations. In addition, the functionality of cooperative prefetching application 106 could be stored as different modules in memories of different devices.

For example, cooperative prefetching application 106 could initially be stored on server computer system 130, and then as necessary, a portion of cooperative prefetching application 106 could be transferred to host computer system 102 and executed on host computer system 102. Consequently, part of the functionality of cooperative prefetching application 106 would be executed on processor 134 of server computer system 130, and another part would be executed on processor 108 of host computer system 102. In view of this disclosure, those of skill in the art can implement various embodiments of the present invention in a wide-variety of physical hardware configurations using an operating system and computer programming language of interest to the user.

In yet another embodiment, cooperative prefetching application 106 is stored in memory 134 of server computer system 130. Cooperative prefetching application 106 is transferred over network 128 to memory 112 in host computer system 102. In this embodiment, I/O interfaces 110 and 138 would include analog modems, digital modems, or a network interface card. If modems are used, network 128 includes a communications network, and cooperative prefetching application 106 is downloaded via the communications network.

This disclosure provides exemplary embodiments of the present invention. The scope of the present invention is not limited by these exemplary embodiments. Numerous variations, whether explicitly provided for by the specification or implied by the specification or not, may be implemented by one of skill in the art in view of this disclosure.

What is claimed is:

1. A computer implemented method comprising:
   detecting creation of a virtualization layer on a computer system, said computer system including an operating system utilizing a superfetch feature which tracks a computing activities and user's interactions to determine which pages the user uses most frequently, the tracking including tracking various activities and information including foreground applications, time of day, day of week, whether and how the user is interacting with the computer system and whether the computer system is running maintenance tasks, and which predictively preloads frequently used pages into low priority system memory based on that tracking; and
   causing said virtualization layer to interact with said superfetch feature so that on creation of said virtualization layer, said superfetch feature is provided the opportunity to act on newly available file system objects of said virtualization layer by at least, in response to the detecting, restarting said superfetch feature so that one or more pages associated with said virtualization layer are identified in a superfetch file utilized by said superfetch feature.

2. The computer implemented method of claim 1 wherein said causing said virtualization application to interact with said superfetch feature so that on creation of said virtualization layer, said superfetch feature is provided the opportunity to act on newly available file system objects of said virtualization layer comprises:
   reading a current superfetch file from a superfetch directory;
   modifying said current superfetch file to include said one or more pages associated with said virtualization layer, said modifying generating a modified superfetch file; and
   writing said modified superfetch file to said superfetch directory so that said current superfetch file is replaced with said modified superfetch file.

3. The computer implemented method of claim 2 further comprising:
   restarting said superfetch feature.

4. The computer implemented method of claim 2 further comprising:
   storing a backup copy of said current superfetch file.

5. The computer implemented method of claim 4 further comprising:
   restarting said superfetch feature.

6. The computer implemented method of claim 1 wherein said causing said virtualization application to interact with said superfetch feature so that on creation of said virtualization layer, said superfetch feature is provided the opportunity to act on newly available file system objects of said virtualization layer comprises:
   tracking usage of pages of said virtualization layer on said computer system;
   generating layer usage information associated with said tracking; and
   loading one or more pages associated with said virtualization layer into low priority system memory based on said layer usage information.

7. The computer implemented method of claim 6 wherein said layer usage information is prioritized.

8. The computer implemented method of claim 6 wherein said one or more pages are loaded into low priority system memory via a low priority input/output (I/O) procedure.

9. The computer implemented method of claim 1 wherein said causing said virtualization application to interact with said superfetch feature so that on creation of said virtualization layer, said superfetch feature is provided the opportunity to act on newly available file system objects of said virtualization layer comprises:
   sending a device insertion message to said operating system, said device insertion message identifying a file system volume including one or more files utilized by said virtualization layer; and
   mapping logical file locations of said one or more files to physical locations of said one or more files in said file system volume so that one or more pages associated with said virtualization layer are identified in a superfetch file utilized by said superfetch feature.

10. The computer implemented method of claim 1 wherein said causing said virtualization application to interact with said superfetch feature so that on creation of said virtualization layer, said superfetch feature is provided the opportunity to act on newly available file system objects of said virtualization layer comprises:
    reading a current superfetch file from a superfetch directory;
    modifying said current superfetch file to include one or more pages associated with said virtualization layer, said modifying generating a modified superfetch file;
    writing said modified superfetch file to an alternate location on said computer system different from said superfetch directory; and
    redirecting said superfetch feature to said modified superfetch file, so that said modified superfetch file is utilized by said superfetch feature rather than said current superfetch file.

11. A computer implemented method comprising:
    detecting removal of one of a plurality of virtualization layers on a computer system, each of said plurality of virtualization layers comprising said computer system including an operating system utilizing a superfetch feature which tracks a computing activities and user's interactions to determine which pages the user uses most frequently, the tracking including tracking various activities and information including foreground applications, time of day, day of week, whether and how the user is interacting with the computer system and whether the computer system is running maintenance tasks, and which predictively preloads frequently used pages into low priority system memory based on that tracking; and in response to said detection, removing file system objects associated with one of said virtualization layers from utilization by said superfetch feature and then restarting said superfetch feature.

12. The computer implemented method of claim 11 wherein said removing file system objects associated with said virtualization layer from utilization by said superfetch feature comprises:

reading a current superfetch file from a superfetch directory;

modifying said current superfetch file to remove said one or more pages associated with said virtualization layer, said modifying generating a modified superfetch file; and writing said modified superfetch file to said superfetch directory so that said current superfetch file is replaced with said modified superfetch file.

13. The computer implemented method of claim 12 further comprising:

restarting said superfetch feature.

14. The computer implemented method of claim 11 wherein said removing file system objects associated with said virtualization layer from utilization by said superfetch feature comprises:

reading a backup copy of said superfetch file; and writing said backup copy of said superfetch file to said superfetch directory so that a current superfetch file is replaced with said backup copy of said superfetch file.

15. The computer implemented method of claim 14 further comprising:

restarting said superfetch feature.

16. The computer implemented method of claim 11 wherein said removing file system objects associated with said virtualization layer from utilization by said superfetch feature comprises:

enumerating pages in low priority system memory, said enumerating identifying one or more enumerated pages; and for each enumerated page of said one or more enumerated pages, said method comprising:

determining whether said enumerated page is associated with said virtualization layer;

upon a determination that said enumerated page is associated with said virtualization layer, instructing a memory cache manager to free said page from said low priority system memory; and upon a determination that said enumerated page is not associated with said virtualization layer, not instructing said memory cache manager to free said page from said low priority system memory.

17. The computer implemented method of claim 11 wherein said removing file system objects associated with said virtualization layer from utilization by said superfetch feature comprises:

in response to said detecting, sending a device deletion message to said operating system, said device deletion message identifying a file system volume including one or more files utilized by said virtualization layer.

18. A computer program product comprising:

a nontransitory computer readable storage medium storing computer program code, which when executed by a processor, performs a process comprising:

a cooperative prefetching application for causing a virtualization layer to interact with a superfetch feature of an operating system which tracks a computing activities and user's interactions to determine which pages the user uses most frequently, the tracking including tracking various activities and information including foreground applications, time of day, day of week, whether and how the user is interacting with the computer system and whether the computer system is running maintenance tasks, and which predictively preloads frequently used pages into low priority system memory based on that tracking, the interaction being configured so that on creation of said virtualization layer, said superfetch feature is provided the opportunity to act on newly available file system objects of said virtualization layer by at least, in response to the detecting, restarting said superfetch feature so that one or more pages associated with said virtualization layer are identified in a superfetch file utilized by said superfetch feature.

19. The computer program product of claim 18 wherein said cooperative prefetching application is further configured for removing file system objects associated with said virtualization layer from utilization by said superfetch feature.

* * * * *